United States Patent [19]
Whaley et al.

[11] Patent Number: 5,818,645
[45] Date of Patent: Oct. 6, 1998

[54] MULTIMODE OPTICAL SOURCE AND IMAGE SCANNING APPARATUS USING THE SAME

[75] Inventors: Gregory J. Whaley, Woodbury; Scott Thomas Mazar, Inver Grove Heights, both of Minn.; Kenneth West Hutt, Wix, Essex, England

[73] Assignee: Management Graphics, Inc., Minneapolis, Minn.

[21] Appl. No.: 682,906

[22] Filed: Jul. 16, 1996

[51] Int. Cl.$^6$ .................................................. G02B 13/08
[52] U.S. Cl. ........................... 359/668; 359/669; 359/207
[58] Field of Search ................................ 359/668, 669, 359/670, 671, 205, 207, 716, 717

[56] References Cited

U.S. PATENT DOCUMENTS

| | | |
|---|---|---|
| 3,946,150 | 3/1976 | Grafton . |
| 4,294,506 | 10/1981 | Hattori . |
| 4,395,721 | 7/1983 | Ohno et al. . |
| 4,401,362 | 8/1983 | Maeda . |
| 4,756,583 | 7/1988 | Morimoto . |
| 4,770,507 | 9/1988 | Arimoto et al. ......................... 359/669 |
| 4,904,068 | 2/1990 | Tatsuno et al. .......................... 359/669 |
| 4,915,484 | 4/1990 | Yamamoto ............................... 359/668 |
| 5,033,806 | 7/1991 | Tomita et al. ........................... 250/234 |
| 5,373,395 | 12/1994 | Adachi .................................... 359/652 |

*Primary Examiner*—Hoa Q. Pham
*Attorney, Agent, or Firm*—Barry R. Lipsitz

[57] ABSTRACT

A focused laser beam is provided using a multimode laser of a type that generates a diverging beam with an asymmetric cross section. A collimation lens receives and substantially collimates the diverging asymmetric beam. An anamorphic beam expander enlarges a width of the substantially collimated beam in a first, multimode axis without substantially affecting the width of the beam in a second, single mode axis orthogonal to the first axis. Demagnification optics are arranged to receive and demagnify the enlarged width beam to produce a focused spot. The demagnification optics can include a cylindrical lens ("rod lens") having a longitudinal axis and arranged to receive the enlarged width beam in a direction substantially perpendicular to the axis. The demagnification optics are merged with scanning optics to produce a scanned spot imaging system. The apparatus is particularly useful for exposing images, e.g., in a dye sublimation printer.

21 Claims, 4 Drawing Sheets

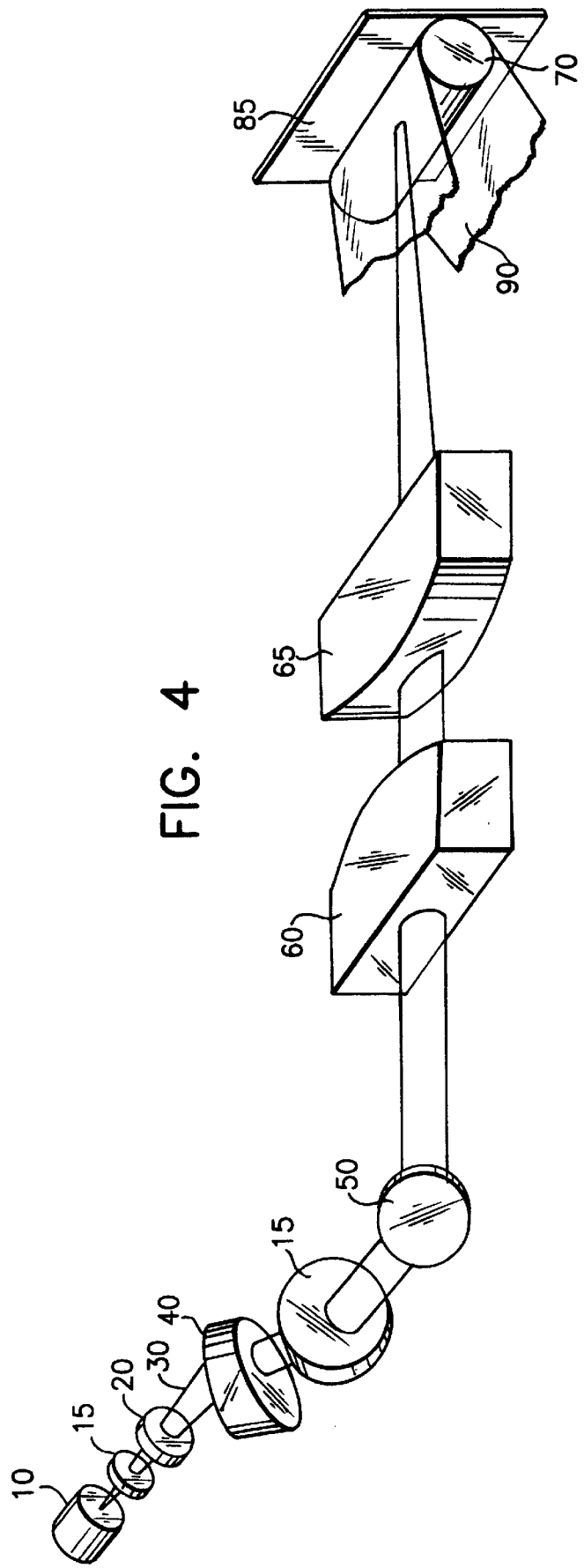

MULTIMODE OPTICAL SOURCE AND IMAGE SCANNING APPARATUS USING THE SAME

BACKGROUND OF THE INVENTION

The present invention relates to the production of a focused laser beam from a multimode laser. One use of the focused beam is in an image exposure apparatus such as a dye sublimation printer, where the beam is scanned across an imaging media.

One method of transfer printing is by using dye sublimation. In sublimation transfer, there is a gap of typically a few microns between a dye donor sheet and a receiver sheet (or other such dye donor and receiver elements). Heating of the donor sheet, e.g., using a laser beam, causes the dye to enter the vapor phase. The dye then crosses the gap and condenses onto the relatively cool surface of the receiver sheet. An apparatus and method for dye sublimation transfer printing is disclosed in concurrently filed, copending U.S. patent application Ser. No. 08/682,905, entitled "Apparatus and Method for Dye Sublimation Transfer Printing," of G. Naylor, K. Hutt, G. Whaley, S. Mazar and J. Teter, incorporated herein by reference.

In the copending application; an embodiment is disclosed wherein a glass rod lens is used to focus the laser beam onto a donor ribbon, which passes about the lens' periphery. The laser beam is at an angle to the normal of a support plate carrying the receiver sheet, so that the glass rod lens focuses the beam to a point on the donor ribbon offset from the point of contact of the donor ribbon with the receiver sheet. Thus, the glass rod acts as both a platen roller and focusing lens.

One problem in designing a dye sublimation printer is that a laser scanning print engine is required that is capable of delivering a focused spot of at least 200 milliwatts (mW) of optical power to the media (e.g., donor sheet). More typically, 500 mW or more of optical power is required to provide acceptable image quality and speed. Preferably, the print engine should be capable of scanning the focused spot at a rate of at least about 150 lines per second. Such a scanning rate would enable the printing of a full color, high resolution 35 millimeter image in less than two minutes.

The use of a relatively high power laser is required because the dye sublimation media has a much lower exposure sensitivity than standard laser printer engines, which expose an electrically charged photosensitive drum using single mode lasers typically delivering less than 200 mW of optical power. Laser diodes are the preferred technology in such print engines due to their small size and relatively low cost, as well as high power efficiency and the ability to modulate the laser intensity directly rather than through an external optical modulator. However, traditional laser print engines are known which use single mode lasers based on gas discharge (e.g., HeNe) laser technology.

The gas discharge and single mode laser diode technologies used in conventional laser print engines cannot provide the optical powers necessary to expose dye sublimation media. Thus, they are not suitable for dye sublimation transfer printers. Currently, only multimode style laser diodes are available that can provide more than 200 mW of optical power.

In order to be useful in a dye sublimation printer, the laser beam must be focused to a spot at the media which is approximately the same size as an image pixel. For example, a 4,096 line, 35 mm image has a pixel size of 8.6 microns. A traditional laser print engine focuses the laser beam to a diffraction-limited spot and can achieve spot sizes of this order given a high enough numerical aperture focusing lens. By nature, the single mode laser diodes used in laser print engines do not produce a collimated beam of light. Instead, diverging cones of light are produced by diffraction from the small emitting aperture of the laser. Single mode laser diodes usually employ a collimation lens close to the laser which captures the diverging cone of light and focuses it into a more traditional collimated laser beam. Once collimated, the beam may be scanned with a suitable scanning system and then focused onto the imaged surface, typically a photosensitive drum. Examples of such laser print engines can be found in U.S. Pat. Nos. 3,946,150 and 4,395,721.

In prior art laser printers, the focal length of the collimation lens is usually quite small, e.g., on the order of 5–15 mm. Furthermore, the focal length of the post-scan focusing lens is quite long, on the order of 50–200 mm or more. The spot size remains small even though this combination of lenses represents a magnification of ten or more because of the nature of a single mode laser beam. A single mode laser diode produces light from what appears to be an ideal point source.

A multimode laser diode also produces a diverging cone of laser light. However, the light emerges from the laser through a much larger exit aperture of perhaps 100 $\mu$m in length. Attempting to collimate a beam from a multimode laser would result in a beam which still significantly diverges. This occurs because the light originates from more than one point source, i.e., an "extended" source. Applying a traditional scanning lens to such a light "bundle" would produce a focused spot which is a geometric magnification of the laser emitting aperture. Thus, for example, a 100 $\mu$m aperture laser diode, if collimated by a 10 mm focal length collimation lens and then focused by a 100 mm scan lens, would result in a spot size of 1 mm, since the lens combination produces a geometrical magnification of 10×. This poor spot size has prevented multimode laser diodes from being used in laser printing applications.

It would be advantageous to provide a scheme for producing a focused beam from a multimode laser that is useful, for example, in dye sublimation printer applications. It would be further advantageous to provide image exposure apparatus using a multimode laser that is useful, for example, in dye sublimation printing. The present invention provides an optical scheme and image exposure apparatus having the aforementioned and other advantages.

SUMMARY OF THE INVENTION

Apparatus for providing a focused laser beam in accordance with the invention uses a multimode laser of a type that generates a diverging beam with an asymmetric cross section. A collimation lens is arranged to receive and substantially collimate the diverging asymmetric beam. An anamorphic beam expander is provided to enlarge a width of the substantially collimated beam in a first, multimode axis without substantially affecting the width of the beam in a second, single mode axis orthogonal to the first axis. Demagnification optics are arranged to receive and demagnify the enlarged width beam to produce a focused spot.

The demagnification optics can comprise a cylindrical lens (e.g., a glass rod lens) having a longitudinal axis. The cylindrical lens is arranged to receive the enlarged width beam in a direction substantially perpendicular to the longitudinal axis. In an illustrated embodiment, the cylindrical lens is a high focal power lens having an effective focal length that is less than the combined effective focal length of the collimation lens and beam expander.

In the illustrated embodiment, the laser is a multimode laser diode. The beam expander, as illustrated, comprises two refracting prisms, although other structures can be used as well.

Image exposure apparatus in accordance with the invention uses a multimode laser for generating a scanning beam. The apparatus includes a multimode laser and a collimation lens arranged to receive and substantially collimate a diverging asymmetric beam output from the laser. An anamorphic beam expander is provided to enlarge a width of the substantially collimated beam in a first, multimode axis without substantially affecting the width of the beam in a second, single mode axis orthogonal to the first axis. Scanning optics are provided for receiving and deflecting the enlarged width beam. Demagnification optics are arranged to receive and demagnify the deflected enlarged width beam from the scanning optics to produce a focused spot (e.g., of a desired size) for scanning across an exposure line in an image plane.

The demagnification optics can comprise a cylindrical lens having a longitudinal axis. Such a cylindrical lens would be arranged to receive the enlarged width beam in a direction substantially perpendicular to the longitudinal axis. It would be advantageous for the cylindrical lens to have a short focal length and to be located adjacent the image plane for focusing the spot at the image plane. In the illustrated embodiment, a high focal power cylindrical lens is utilized, having an effective focal length that is less than the combined effective focal length of the collimation lens and beam expander.

The laser used in the image scanning apparatus can comprise, for example, a multimode laser diode having an output of at least about 200 mW.

BRIEF DESCRIPTION OF THE DRAWINGS

FIG. 4 is a perspective view of the optics illustrated in FIGS. 1–3, further illustrating a dye sublimation donor material partially wrapped around the cylindrical focusing lens and a receiver sheet located adjacent thereto.

DETAILED DESCRIPTION OF THE INVENTION

Figure 1:
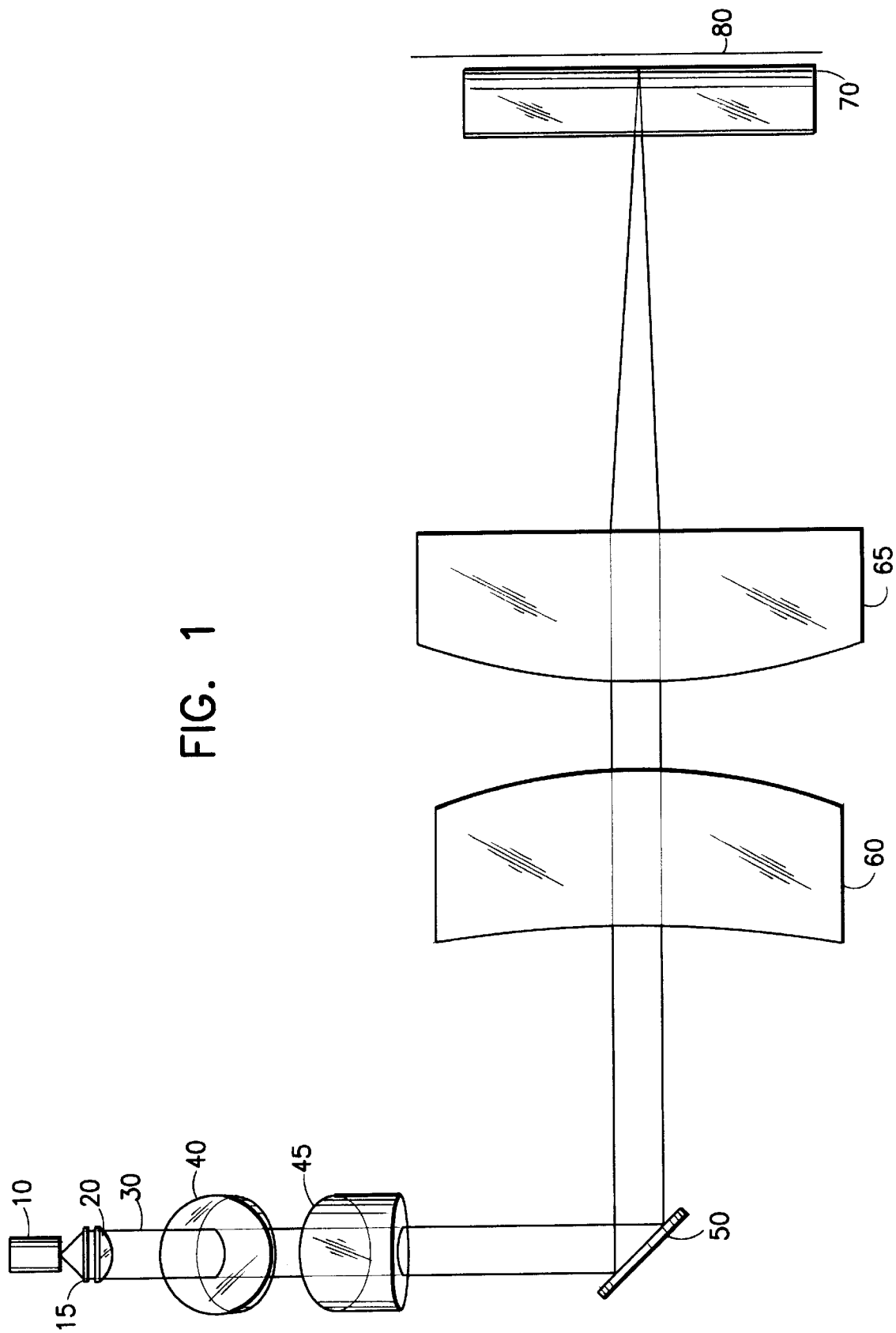
FIG. 1 is a schematic top view of an optical system in accordance with the present invention.
Figure 2:
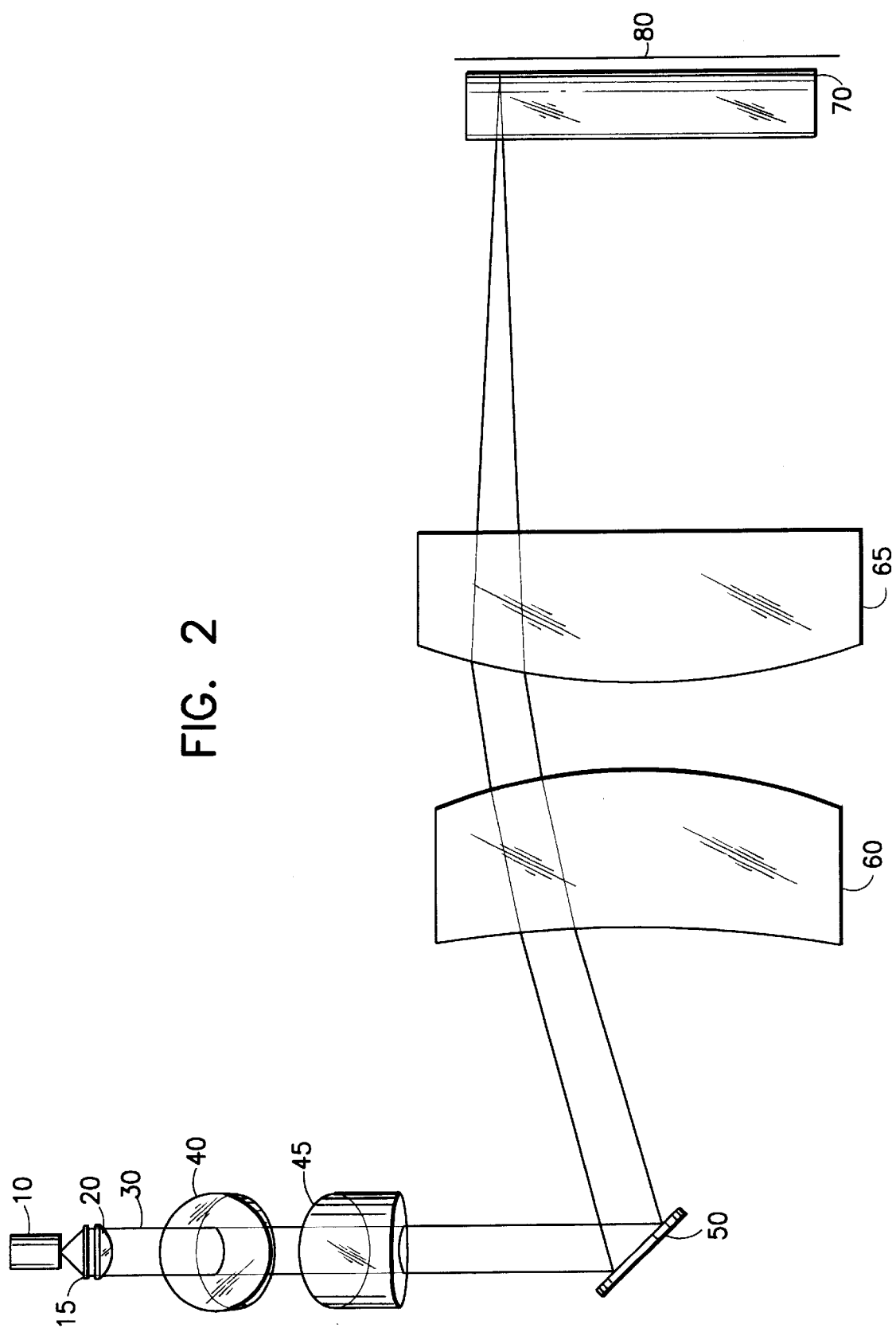
FIG. 2 is a schematic diagram similar to FIG. 1 but showing the deflection of a collimated beam via a scanning mirror.
Figure 3:
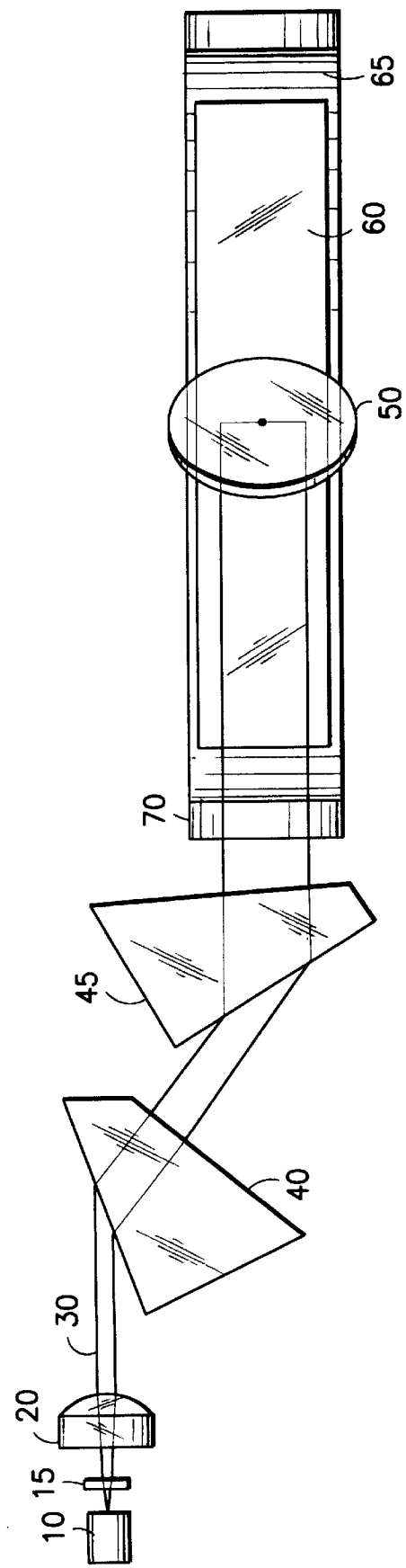
FIG. 3 is a view of the optics illustrated in FIGS. 1 and 2 from a direction perpendicular to a longitudinal axis of the cylindrical focusing lens.

The optical system of the present invention combines a laser diode-based scanning system with a unique arrangement of demagnification optics to demagnify a multimode source to an acceptable image spot size. In the context of the present disclosure, demagnification of a multimode beam is provided using a relatively long focal length collimation lens and a relatively short focal length objective lens. The objective lens is placed near the image plane. Various factors make the combination of a laser diode-based scanning system with the necessary demagnification optics difficult. For example, it is difficult to maintain a high transmission efficiency from the laser to the image. Long focal length collimation lenses of reasonable diameter tend to have poor light capturing ability due to a low numerical aperture ("NA"). Furthermore, demagnifying the source size means sacrificing transmitted power. Moreover, having a short focal length lens near the image plane conflicts with the scanning requirements of a practical image scanning apparatus.

In order to overcome these problems, the present invention takes advantage of the asymmetry of the beam emitted from a multimode diode laser. Such laser diodes are diffraction limited in a single mode axis which is perpendicular to the multimode axis. The divergence of the cone of laser light from the diode is similarly asymmetric. In order to provide an optical arrangement meeting the requirements of image scanning apparatus such as a dye sublimation printer, the present invention performs source size demagnification of a multimode laser beam only in the multimode axis, while traditional collimation, scanning and focusing proceeds in the single mode axis. To accomplish this, an anamorphic beam expander is provided after the collimation lens and a high power lens with a short focal length, such as cylinder lens, is used near the image plane.

The anamorphic beam expander does not alter the collimated beam in the single mode axis. In the multimode axis, however, the beam is expanded to a larger diameter, effectively increasing the focal length of the collimation lens by approximately the beam expansion factor, typically 3× to 6×. The combination of the collimation lens and the beam expander provides good power transmission since it matches the numerical apertures of the two axes to the asymmetric angles of the laser diode. This structure collimates the laser beam, collects most of the light from the laser diode, and provides a relatively long focal length in the multimode axis for effective demagnification at the image plane.

In order to use the optical system of the present invention in a scanning image exposure apparatus, the demagnification process further requires a short focal length lens ("objective lens") near the image plane. The demagnification of the laser source may be estimated by taking the laser source size and multiplying it by the ratio of the objective lens focal length to the effective collimation lens focal length. A disadvantage of placing the objective lens at the image plane is that the scan length of the laser beam is severely restricted. However, this limitation is removed in the structure disclosed herein by using the objective lens only to focus light in the multimode axis which needs demagnification. In the illustrated embodiment, this is accomplished using a cylinder lens (e.g., a glass "rod lens"). If the effective focal length of the cylindrical objective lens is less than the effective focal length of the collimation system (i.e., the collimation lens and the anamorphic beam expander), then the spot size at the image plane will be less than the laser diode aperture size and high resolution printing will be possible.

The figures illustrate an optical system in accordance with the invention. A high power, multimode laser diode 10 produces light which diverges asymmetrically. This light can be passed through an optional protective window 15, which is merely a flat piece of glass used to keep the laser diode clean when the optics are used in an image scanning apparatus. A collimation lens 20 collects the light with high efficiency and produces a substantially collimated beam 30. The beam 30 is not perfectly collimated since the laser diode emission aperture is of significant size, e.g., on the order of 100 μm or more. Thus, a laser beam is produced which is well collimated in the single mode axis and slightly diverging in the multimode axis. Since the laser light emission angles from the laser diode are asymmetric, the collimated beam has an asymmetric width which is wide in the single mode axis and relatively narrow in the multimode axis.

The collimated beam 30 enters a beam expander which, in the illustrated embodiment, comprises first and second prisms 40, 45. The beam expander refracts the beam in the single mode axis only and enlarges the beam width in the multimode axis only. The beam expansion process has the beneficial effect of increasing the effective focal length of the collimation lens. This is important in order to demagnify the beam at the image plane, thereby providing a desired small spot size.

In order to use the optical system in a scanning image exposure apparatus, the expanded collimated beam is scanned over a range of angles by a scanner 50. The scanner can comprise any of various known scanning elements, such as rotating polygon mirrors or galvanometric moving mirrors. The collimated laser beam is swept by the scanner 50 and directed into a series of scan lenses 60, 65 which are optimized for both focusing the single mode laser spot at the image plane 80 and preparing the beam in the multimode axis for final focusing by a cylindrical objective lens 70. As will be appreciated by those skilled in the art, the design of the scan lenses and objective lens are interdependent and both elements must be taken into account in order to provide a desired spot size at the image plane.

In an example embodiment, the laser 10 is a one-watt, GaAlAs multimode laser diode producing light at 800 nanometers (nm). The emitting aperture is 100 $\mu$m wide and produces a diverging cone of light at 9°×45° divergence angles. This light is collected by the collimation lens 20 which can comprise, for example, a commercially available molded glass aspheric lens with numerical aperture of 0.55 and effective focal length of 4.51 mm. Such a structure will result in a collimated beam that is about 5 mm wide in the single mode axis and about 1 mm wide in the multimode axis. The beam expander 40, 45 can, for example, consist of two refracting prisms made of SF11 optical glass with opposite surfaces oriented 29.4° apart. The prisms are oriented to give a 6× beam expansion in the multimode axis. The effective focal length of the collimator and beam expander will then be 27 mm. If the light transmission efficiency of the collimator and beam expander is 70 percent, a collimated beam of 700 mW optical power will result.

The scanner 50 can comprise, for example, a galvanometric scanner. The orientation of the laser beam to the galvanometric scanner is such that the scanning is in the single mode axis. The scanned beam is then focused by three lens elements. These are lens 60, which can comprise a meniscus lens with spherical surfaces, lens 65 which can comprise a plano-convex cylinder lens, and finally the rod lens 70 which is a double convex cylindrical objective lens. The objective lens can comprise, for example, a complete cylinder of revolution with 7 mm diameter, fabricated from Schott LaSF18A optical glass. Such an objective lens will produce an effective focal length of about 7 mm in the multimode axis. The other lens elements do not strongly contribute to the demagnification of the laser source aperture. Thus, the multimode spot size is 100*7/27=26 $\mu$m, where the emitting aperture of the laser diode is 100 $\mu$m wide.

In the example illustrated embodiment, the meniscus lens 60 uses Schott SF11 glass, has a first surface radius of 110.69 mm concave and a second surface radius of 56.34 mm convex. The thickness is 15.13 mm. The plano-convex cylinder lens 65 uses Schott SF11 glass, has a first surface radius of 64.21 mm convex cylinder and an infinite (planar) second surface radius (i.e., it is "flat"). The thickness is 15.00 mm. The spacing from mirror 50 to meniscus lens 60 is 32.64 mm. The distance from lens 60 to lens 65 is 9.16 mm. The spacing from lens 65 to rod lens 70 is 39.03 mm.

The scan lenses are designed to focus the laser spot at the exit surfaces of the objective lens. A media to be exposed, such as a dye sublimation transfer sheet, photographic film, xerographic photoreceptor, or the like, is then placed at the image plane 80 in contact with the exit surface of the objective lens 70, to maintain precise focus of the spot on the media in spite of the short depth of focus of the spot. As illustrated in greater detail in FIG. 4, the media can comprise a ribbon of material 90 which wraps around the rod lens 70. Where the invention is used in connection with a dye sublimation printer, the receiver element 85 is placed adjacent the donor sheet 90, separated by a small gap.

The scan lens design is telecentric. This means that the scanned laser beam always enters the objective lens substantially perpendicular to the longitudinal lens axis to minimize lens aberrations. The spot focus is maintained along the length of the objective lens yielding a flat image field required for high performance scanning.

In the example embodiment discussed above, the spot position versus scan angle is not an ideal f-theta design and the velocity error can be about three percent at the ends of the scan. The scan lenses focus the single mode axis to, e.g., a 12 $\mu$m full width, half maximum (FWHM) spot. The system of this example will thus produce approximately 650 mW of laser light into a scanned spot 12×26 $\mu$m in size. It is noted that the specific embodiment described above is merely an example, and that apparatus in accordance with the invention can provide a focused laser beam having any other desirable parameters.

It should now be appreciated that the present invention provides apparatus that enables a desired focused laser beam to be produced using a multimode laser. The system can be designed to scan a high power laser beam in a line with a small focused spot and a high laser power.

In the past, it has not been possible to successfully use multimode beams in applications that required light to be focused to small spots. The invention recognizes and takes advantage of the fact that even multimode laser light is well behaved (single mode) in one axis, whereas it is multimode in the other axis. By collimating the multimode axis and reducing its spot size through demagnification, a small focused spot is obtained. Thus, a high power multimode laser diode can be used for applications such as dye sublimation printing.

In the illustrated embodiment, demagnification is provided through the collimator, beam expansion prisms, and the rod lens in a manner which optimizes the highest laser power efficiency while attaining the smallest spot size. In addition, the scan lenses aid in the demagnification while maintaining focus of the single mode portion of the spot to a diffraction limited (i.e., small) spot while keeping the spot in focus across the entire length of the scan to provide a flat field.

Although the invention has been described in connection with a preferred embodiment, those skilled in the art will appreciate that various adaptations and modifications may be made thereto without departing from the spirit and scope of the invention as set forth in the claims.

We claim:

1. Apparatus for providing a focused laser beam comprising:
   a multimode laser of a type having a finite source size that generates a diverging beam with an asymmetric cross section;
   a collimation lens arranged to receive and substantially collimate said diverging asymmetric beam;
   an anamorphic beam expander for enlarging a width of the substantially collimated beam along a first, multimode axis without substantially affecting the width of said beam in a second, single mode axis orthogonal to said first axis;

demagnification optics arranged to receive and demagnify the enlarged width beam to produce a focused spot, said demagnification optics being oriented with respect to said first axis to provide demagnification substantially along said first axis; and optical focusing means disposed between said anamorphic beam expander and said demagnification optics for focusing said enlarged width beam to achieve said focused spot.

2. Apparatus in accordance with claim 1 wherein said demagnification optics comprise a cylindrical lens having a longitudinal axis, said cylindrical lens being arranged to receive said enlarged width beam in a direction substantially perpendicular to said longitudinal axis;

said cylindrical lens further being arranged such that the first axis is substantially perpendicular to said longitudinal axis.

3. Apparatus in accordance with claim 2 wherein said cylindrical lens is a high focal power lens having an effective focal length that is less than the combined effective focal length of said collimation lens and beam expander.

4. Apparatus in accordance with claim 3 wherein said laser is a multimode laser diode.

5. Apparatus in accordance with claim 4 wherein said beam expander comprises two refracting prisms.

6. Apparatus in accordance with claim 1 wherein said laser is a multimode laser diode.

7. Apparatus in accordance with claim 1 wherein said beam expander comprises two refracting prisms.

8. Apparatus in accordance with claim 1, further comprising:

optical focusing means disposed between said anamorphic beam expander and said demagnification optics for focusing said expanded width beam to achieve said focused spot.

9. Apparatus in accordance with claim 1, wherein said demagnification optics provide demagnification substantially only along said first axis.

10. Multimode laser based image exposure apparatus for generating a scanning beam comprising:

a multimode laser;

a collimation lens arranged to receive and substantially collimate a diverging asymmetric beam output from said laser;

an anamorphic beam expander for enlarging a width of the substantially collimated beam along a first, multimode axis without substantially affecting the width of said beam in a second, single mode axis orthogonal to said first axis;

an optical scanner for receiving and deflecting the enlarged width beam;

demagnification optics arranged to receive and demagnify the deflected enlarged width beam from said scanner to produce a focused spot for scanning across an exposure line; and optical focusing means disposed between said anamorphic beam expander and said demagnification optics for focusing said enlarged width beam to achieve said focused spot;

wherein said multimode laser is arranged relative to said optical scanner to provide scanning substantially along said second axis.

11. Image exposure apparatus in accordance with claim 10 wherein said cylindrical lens is a short focal length lens adjacent said image plane for focusing said spot at said image plane.

12. Image exposure apparatus in accordance with claim 10 wherein said cylindrical lens is a high focal power lens having an effective focal length that is less than the combined effective focal length of said collimation lens and said beam expander.

13. Image exposure apparatus in accordance with claim 12 wherein said laser is a multimode laser diode.

14. Image exposure apparatus in accordance with claim 13 wherein said beam expander comprises two refracting prisms.

15. Image exposure apparatus in accordance with claim 10 wherein said beam expander comprises two refracting prisms.

16. Image exposure apparatus in accordance with claim 10 wherein said demagnification optics comprise a cylindrical lens adjacent an image plane of a dye sublimation printer, said cylindrical lens having a longitudinal axis and being arranged to receive said enlarged width beam in a direction substantially perpendicular to said longitudinal axis.

17. Image exposure apparatus in accordance with claim 16 wherein said laser is a multimode laser diode having an output of at least about 200 mW.

18. Image exposure apparatus in accordance with claim 17 wherein said cylindrical lens has an effective focal length that is less than the combined effective focal length of said collimation lens and beam expander in order to provide a spot size at said image plane which is less than an aperture size of said laser diode.

19. Image exposure apparatus in accordance with claim 18 wherein said cylindrical lens is a short focal length lens adjacent said image plane for focusing said spot at said image plane.

20. Image exposure apparatus in accordance with claim 10, wherein said demagnification optics is oriented with respect to said first axis to provide demagnification substantially along said first axis.

21. Image exposure apparatus in accordance with claim 10 wherein said demagnification optics provide demagnification substantially only along said first axis.

* * * * *